(12) United States Patent
Fox (10) Patent No.: US 8,827,859 B2
(45) Date of Patent: Sep. 9, 2014

(54) DIFFERENTIAL HAVING TWO-PIECE CASE SPLIT THROUGH PLANETARY CARRIER WALL

(71) Applicant: Eaton Corporation, Cleveland, OH (US)

(72) Inventor: Matthew G. Fox, Ceresco, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/049,325

(22) Filed: Oct. 9, 2013

(65) Prior Publication Data

US 2014/0179481 A1 Jun. 26, 2014

Related U.S. Application Data

(60) Provisional application No. 61/712,239, filed on Oct. 10, 2012, provisional application No. 61/863,026, filed on Aug. 7, 2013, provisional application No. 61/863,093, filed on Aug. 7, 2013.

(51) Int. Cl.
*F16H 48/20* (2012.01)
*F16H 48/40* (2012.01)

(52) U.S. Cl.
CPC ..................................... *F16H 48/40* (2013.01)
USPC .......................................................... 475/231

(58) Field of Classification Search
USPC ......... 475/231, 230, 243, 245, 246, 247, 331, 475/324, 338, 318, 339, 340, 341, 342, 249, 475/252, 248, 160, 344, 336; 74/606 R, 607
See application file for complete search history.

(56) References Cited

U.S. PATENT DOCUMENTS

| | | | |
|---|---|---|---|
| 6,840,883 B2 | 1/2005 | Orr et al. | |
| 7,033,301 B2 * | 4/2006 | Kimes | 475/340 |
| 7,207,110 B2 | 4/2007 | Pascoe et al. | |
| 7,819,040 B2 | 10/2010 | Meier et al. | |
| 7,951,037 B2 | 5/2011 | Sudorowski et al. | |
| 8,083,628 B2 * | 12/2011 | Soybel et al. | 475/160 |
| 8,156,843 B2 * | 4/2012 | Povirk et al. | 74/650 |
| 8,444,522 B2 | 5/2013 | Cripsey et al. | |
| 8,517,884 B2 * | 8/2013 | Geiman et al. | 475/230 |
| 8,544,174 B2 | 10/2013 | Isken, II et al. | |
| 8,591,375 B2 * | 11/2013 | Maruyama et al. | 475/231 |
| 8,628,444 B2 | 1/2014 | Cripsey et al. | |
| 2006/0276296 A1 | 12/2006 | Rosochacki et al. | |
| 2012/0325047 A1 | 12/2012 | Cripsey | |

FOREIGN PATENT DOCUMENTS

WO 2010016896 A 2/2010

* cited by examiner

*Primary Examiner* — Justin Holmes
*Assistant Examiner* — David J Hlavka
(74) *Attorney, Agent, or Firm* — Remarck Law Group PLC (57) ABSTRACT

A differential gear mechanism constructed in accordance to one example of the present disclosure can include a planetary gear assembly having a plurality of planetary gears rotatably mounted on a corresponding plurality of planetary gear shafts. A first differential case portion can have a plurality of first planetary gear shaft mounting surfaces. A second differential case portion, separately formed from the first differential case portion can have a plurality of second planetary gear shaft mounting surfaces. A differential gear assembly can be arranged in at least one of the first and second differential case portions. The first and second plurality of gear shaft mounting surfaces can cooperate to mount the corresponding plurality of planetary gear shafts in an assembled position.

20 Claims, 9 Drawing Sheets

DIFFERENTIAL HAVING TWO-PIECE CASE SPLIT THROUGH PLANETARY CARRIER WALL

CROSS-REFERENCE TO RELATED APPLICATIONS

This application claims the benefit of U.S. Provisional Application No. 61/712,239 which was filed on Oct. 10, 2012, and U.S. Provisional Application Nos. 61/863,093 and 61/863,026, which were filed on Aug. 7, 2013. The disclosures of each of the above applications are incorporated herein by reference in their entirety.

FIELD

The present disclosure relates generally to differential gear assemblies and more particularly to a differential gear case arrangement having a two-piece case split through a planetary carrier wall.

BACKGROUND

A differential gear mechanism can be provided in an axle assembly and used to transfer torque from a driveshaft to a pair of output shafts. The driveshaft can drive the differential through the use of a bevel gear that meshes with a ring gear mounted to a housing of the differential. In automotive applications, a differential allows the tires mounted at either end of the axle assembly to rotate at different speeds. This is important when the vehicle is turning because the outer tire travels over an arc of greater distance than the inner tire. Thus, the outer tire must rotate at a faster speed than the inner tire to compensate for the greater distance of travel. The differential includes a differential case and a gear arrangement that allows torque to be transferred from the driveshaft to the output shafts while concurrently allowing the output shafts to rotate at different speeds as needed. The gear arrangement can generally include a pair of side gears that are mounted for rotation with the respective output shafts. A series of cross pins or pinion gear shafts are fixedly mounted to the differential case for rotation therewith. A corresponding plurality of pinion gears are mounted for rotation with the pinion gear shafts and are in meshing relationship with both of the side gears.

Some differential gear mechanisms include traction modifying differentials. Typically, a clutch pack can be disposed between one of the side gears and an adjacent surface of the differential case. The clutch pack or locking mechanism is operable to limit relative rotation between the gear case and the one side gear. In such differentials, engaging the clutch pack or locking mechanism (retarding differentiation) is achieved by one of several different approaches. Some configurations include a piston that actuates to cause the clutch pack to move between open, locked and partially locked conditions. In some arrangements, hydraulic fluid is delivered to actuate the piston.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A differential gear mechanism constructed in accordance to one example of the present disclosure can include a planetary gear assembly having a plurality of planetary gears rotatably mounted on a corresponding plurality of planetary gear shafts. A first differential case portion can have a plurality of first planetary gear shaft mounting surfaces. A second differential case portion, separately formed from the first differential case portion can have a plurality of second planetary gear shaft mounting surfaces. A differential gear assembly can be arranged in at least one of the first and second differential case portions. The first and second plurality of gear shaft mounting surfaces can cooperate to mount the corresponding plurality of planetary gear shafts in an assembled position.

According to additional features, the first differential case portion can include a first radial end surface having a plurality of alternately arranged first inset portions and outset portions. The second differential case portion can include a second radial end surface having a plurality of alternately arranged second inset portions and outset portions. In the assembled position, the first inset portions align with the second inset portions to define a plurality of pockets therebetween. The plurality of planetary gears can be received at the respective plurality of pockets. In the assembled position, the first outset portions align with the second outset portions at a mating plane that intersects the plurality of planetary gears. A plurality of fasteners can couple the first and second differential case portions together.

According to other features, a plurality of pins can be received and supported between (i) a plurality of first pin mounting grooves defined on the first differential case portion and (ii) a plurality of second pin mounting grooves defined on the second differential case portion. A snap ring can be received in a snap ring groove defined on one of the first and second differential gear case portions. The snap ring can axially retain the plurality of planetary gear shafts relative to the first and second differential case portions. Each of the first plurality of planetary gear shaft mounting surfaces can comprise (i) an end face surface that axially opposes a corresponding planetary gear shaft and (ii) a radial support surface that radially opposes a corresponding planetary gear shaft. Each of the second plurality of planetary gear shaft mounting surfaces can comprise (i) an outer radial support surface and (ii) an inner radial support surface. The outer and inner radial support surfaces can be axially offset from each other. A clutch assembly can couple the planetary gear assembly to the differential gear assembly.

A differential assembly constructed in accordance to other features of the present disclosure can include a planetary gear assembly having a plurality of planetary gears rotatably mounted on a corresponding plurality of planetary gear shafts. A first differential case portion can have (i) a plurality of first planetary gear shaft mounting surfaces and (ii) a plurality of first pin mounting grooves. A second differential case portion, separately formed from the first differential case portion can have (i) a plurality of second planetary gear shaft mounting surfaces and (ii) a plurality of second pin mounting grooves. A plurality of pins can be received by the plurality of first and second mounting grooves in an assembled position. The first and second plurality of gear shaft mounting surfaces can cooperate to mount the corresponding plurality of planetary gear shafts in the assembled position.

According to further features, the first differential case portion can include a first radial end surface having a plurality of alternately arranged first inset portions and outset portions. The second differential case portion can include a second radial end surface having a plurality of alternately arranged second inset portion and outset portions. In the assembled position, the first inset portions can align with the second inset portions to define a plurality of pockets therebetween. The plurality of planetary gears can be received at the respective plurality of pockets.

According to other features, in the assembled position, the first outset portions can align with the second outset portions at a mating plane that intersects the plurality of planetary gears. A plurality of fasteners can couple the first and second differential case portions together. Each of the first plurality of planetary gear shaft mounting surfaces can comprise (i) an end face surface that axially opposes a corresponding planetary gear shaft and (ii) a radial support surface that radially opposes a corresponding planetary gear shaft. Each of the second plurality of planetary gear shaft mounting surfaces can comprise (i) an outer radial support surface and (ii) an inner radial support surface. The outer and inner radial support surfaces can be axially offset from each other.

A differential assembly constructed in accordance to additional features of the present disclosure can include a planetary gear assembly having a plurality of planetary gears rotatably mounted on a corresponding plurality of planetary gear shafts. A first differential case portion can have (i) a plurality of first planetary gear shaft mounting surfaces; (ii) a plurality of first pin mounting grooves and (iii) a first radial end surface. A second differential case portion, separately formed from the first differential case portion can have (i) a plurality of second planetary gear shaft mounting surfaces, (ii) a plurality of second pin mounting grooves and (iii) a second radial end surface. The differential assembly can further include a plurality of pins and a plurality of fasteners. In an assembled position, (i) the plurality of pins can be received by the plurality of first and second pin mounting grooves, (ii) the first and second plurality of gear shaft mounting surfaces can cooperate to mount the corresponding plurality of planetary gear shafts and (iii) the first and second radial end surfaces can align at a mating plane that intersects the plurality of planetary gears.

According to additional features, each of the first plurality of planetary gear shaft mounting surfaces can comprise (i) and end face surface that axially opposes a corresponding planetary gear shaft and (ii) a radial support surface that radially opposes a corresponding planetary gear shaft. Each of the second plurality of planetary gear shaft mounting surfaces can comprise (i) an outer radial support surface and (ii) an inner radial support surface. The outer and inner radial support surfaces can be axially offset from each other.

BRIEF DESCRIPTION OF THE DRAWINGS

The present disclosure will become more fully understood from the detailed description and the accompanying drawings, wherein.

DETAILED DESCRIPTION

Figure 1:
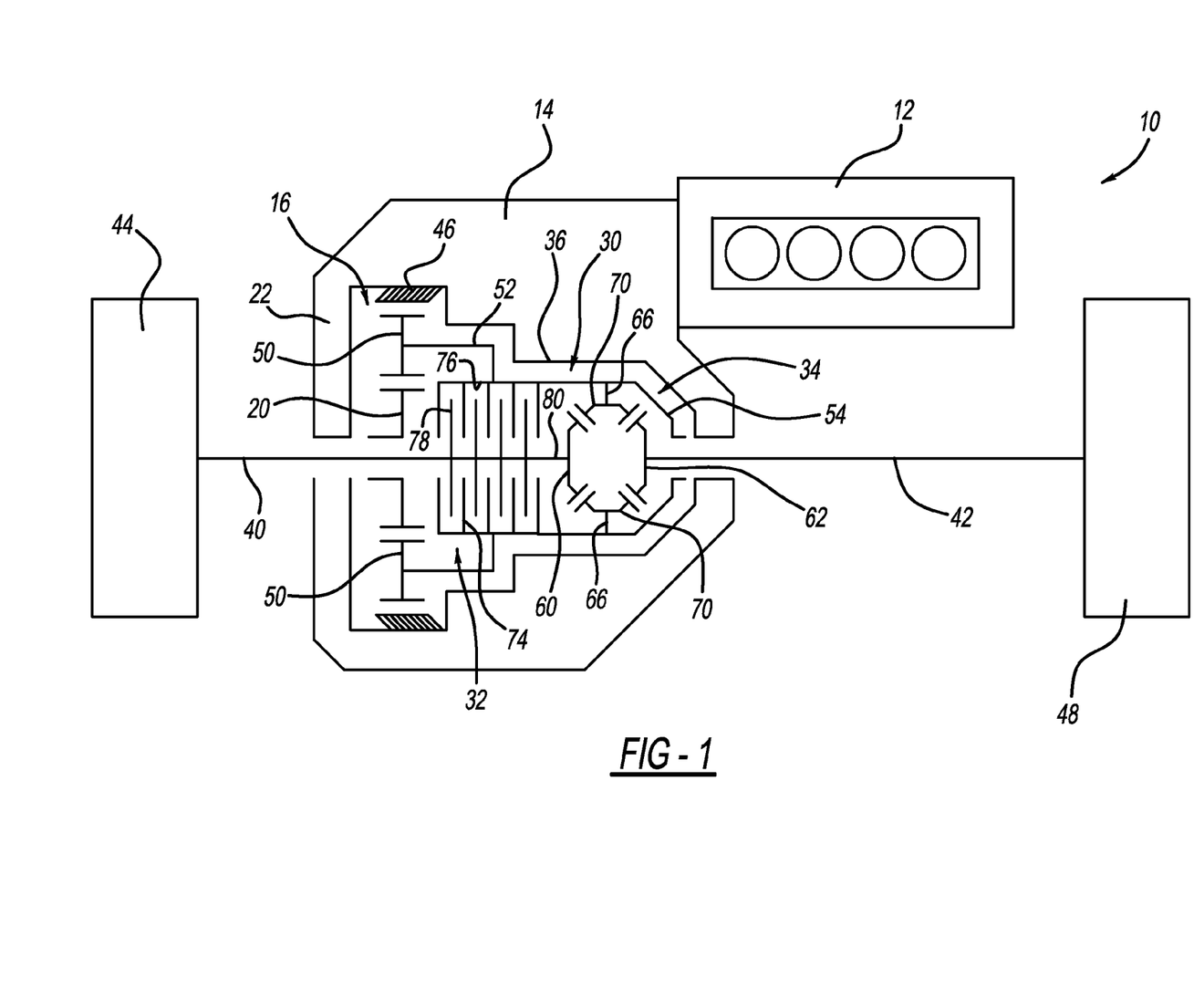
FIG. 1 is a schematic view of an exemplary vehicle driveline incorporating a differential gear mechanism constructed in accordance to one example of the present disclosure.

With initial reference to FIG. 1, an exemplary vehicle driveline is shown and generally identified with reference numeral 10. The exemplary vehicle driveline 10 described herein is for a front wheel drive vehicle having a transversely mounted engine 12, although other configurations can be utilized with the present disclosure. The engine 12 provides a rotary output to a transmission 14.

The driveline 10 can further include a transaxle 22 and a limited slip differential assembly 30 having a planetary gear assembly 16, a clutch assembly 32 and a differential gear assembly or mechanism 34. The limited slip differential assembly 30 is received in a housing 36 and operates to drive a pair of axle shafts 40 and 42 that are connected to front drive wheels 44 and 48, respectively. In general, the limited slip differential assembly 30 functions as a traditional open differential during normal operating conditions until an event occurs where a bias torque is required. When a loss in traction is detected or anticipated, the clutch assembly 32 can be selectively actuated in order to generate the optimum bias ratio for the situation.

The transmission 14 can receive the rotary output from the engine 12 and provide a rotary input to the limited slip differential assembly 30. Further, the transmission 14 can be operable to provide various gear ratios between the rotary output of the engine 12 and the rotary input of the limited slip differential assembly 30.

The planetary gear assembly 16 includes a ring gear 46, a sun gear 20 and a plurality of planet gears 50 carried by a planet carrier 52. The plurality of planet gears 50 are rotatably mounted on a corresponding plurality of planetary gear shaft 51. The ring gear 46 is non-rotatably fixed to the housing 36, and the sun gear 20 is meshingly engaged with the plurality of planet gears 50 carried by the planet carrier 52. The planet gears 50 are meshed with the ring gear 46. The planet carrier 52 is coupled for rotation with a differential carrier or case 54 of the differential gear assembly 34. The planetary gear assembly 16 provides a gear ratio reduction from the sun gear 20 to the planetary carrier 52 and, therefore, to the differential case 54. The sun gear 20 is rotatably coupled to the transmission 14 via a coupling device, such as a chain or belt, such that an output of the transmission 14 drivingly rotates the sun gear 20, which translates rotational output from the transmission 14 into rotational input of the sun gear 20.

Figure 3:
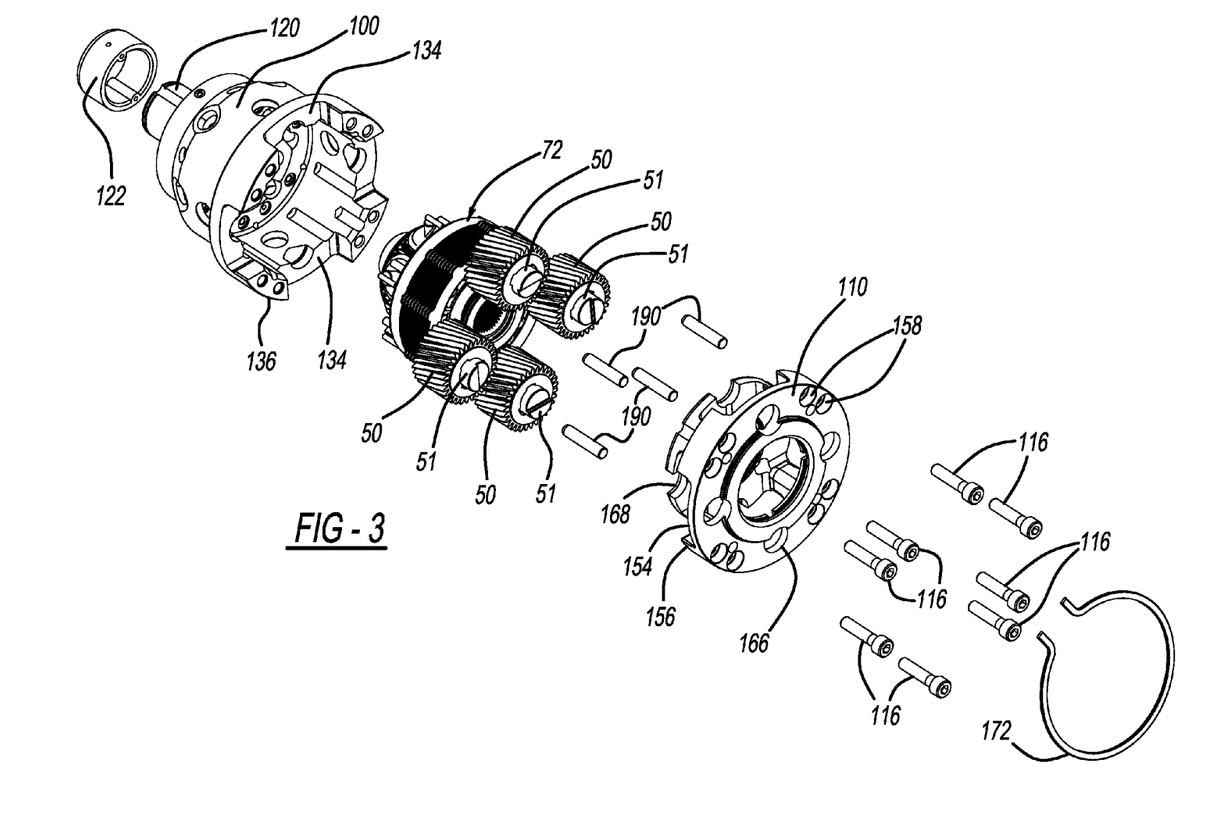
FIG. 3 is a rear perspective of the limited slip differential shown in FIG. 2.

The differential gear assembly 34 includes a pair of side gears 60 and 62 that are mounted for rotation with the axle shafts 40 and 42 (and first and second drive wheels 44 and 48), respectively. The side gears 60 and 62 define first and second axle shaft openings 64 and 65 (FIG. 3). A plurality of cross pins or pinion gear shafts 66 are fixedly mounted to the differential case 54 for rotation therewith. A corresponding plurality of pinion gears 70 are mounted for rotation with the pinion gear shafts 66 and are in meshing relationship with both of the side gears 60 and 62. In an open configuration, described more fully below, the differential gear assembly 34 acts to allow the axle shafts 40 and 42 to rotate at different speeds.

The clutch assembly 32 couples the planetary gear assembly 16 with the differential gear assembly 34. The clutch assembly 32 includes a clutch pack 72 and a clutch actuator 73. The clutch pack 72 includes a plurality of annular plates 74 interleaved between a plurality of annular friction disks 78. The plurality of annular plates 74 can be coupled for rotation with one of the differential case 54 and the differential gear assembly 34. The plurality of annular friction disks 78 can be coupled for rotation with the other one of the differential case 54 and the differential gear assembly 34. In the illustrated embodiment, the plurality of annular plates 74 are coupled for rotation to the differential case 54 (e.g., splined to an inner diameter 76 of the differential case 54) and the plurality of annular friction disks 78 are coupled for rotation with the differential gear assembly 34 (e.g., splined to an outer diameter 80 of the side gear 60). It will be appreciated that the annular friction disks 78 may be supported for rotation by either of the side gears 60 or 62, or both.

The plurality of annular plates 74 and annular friction disks 78 are interleaved between one another and act to rotate past one another in substantially non-contacting relationship when the clutch assembly 32 is in its open position. However, it will be appreciated by those skilled in the art that the term "non-contacting" as used herein is relative and is not meant to necessarily indicate that the annular plates 74 and annular friction disks 78 have absolutely no contact when the clutch assembly 32 is in the open condition. The annular plates 74 and annular friction disks 78 are axially movable into frictional engagement relative to one another, thereby reducing relative rotation between the annular plates 74 and annular friction disks 78 when the clutch assembly 32 is in the closed or partially closed configurations. In this manner, when the clutch assembly 32 is in its closed position, the side gears 60 and 62, as well as the axle shafts 40 and 42 and the drive wheels 44 and 48 rotate together.

The clutch assembly 32 can operate in an open configuration to allow the side gears 60 and 62 to rotate independently from each other, e.g., at different speeds. The clutch assembly 32 can also operate in a closed or partially closed configuration where the side gears 60 and 62 rotate together or partially together (that is, not independently), e.g., at substantially the same speed. The clutch assembly 32 can, for example, be a hydraulic clutch assembly 32 that utilizes pressurized hydraulic fluid that can act on a piston 82 of the clutch actuator 73 to selectively actuate the clutch pack 72 between the open, closed and partially closed configurations.

Figure 2:
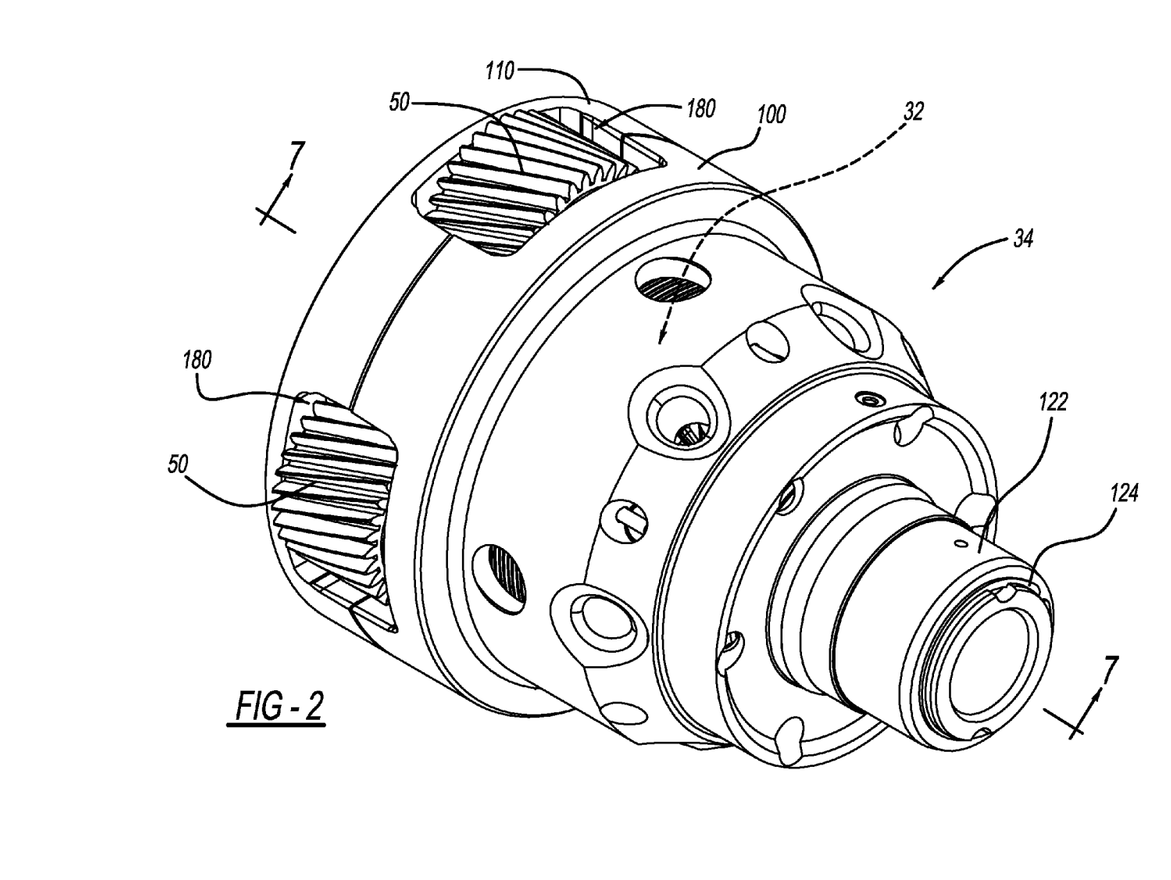
FIG. 2 is a perspective view of a limited slip differential assembly incorporating a first and second differential case portion constructed in accordance to one example of the present disclosure.
Figure 6:
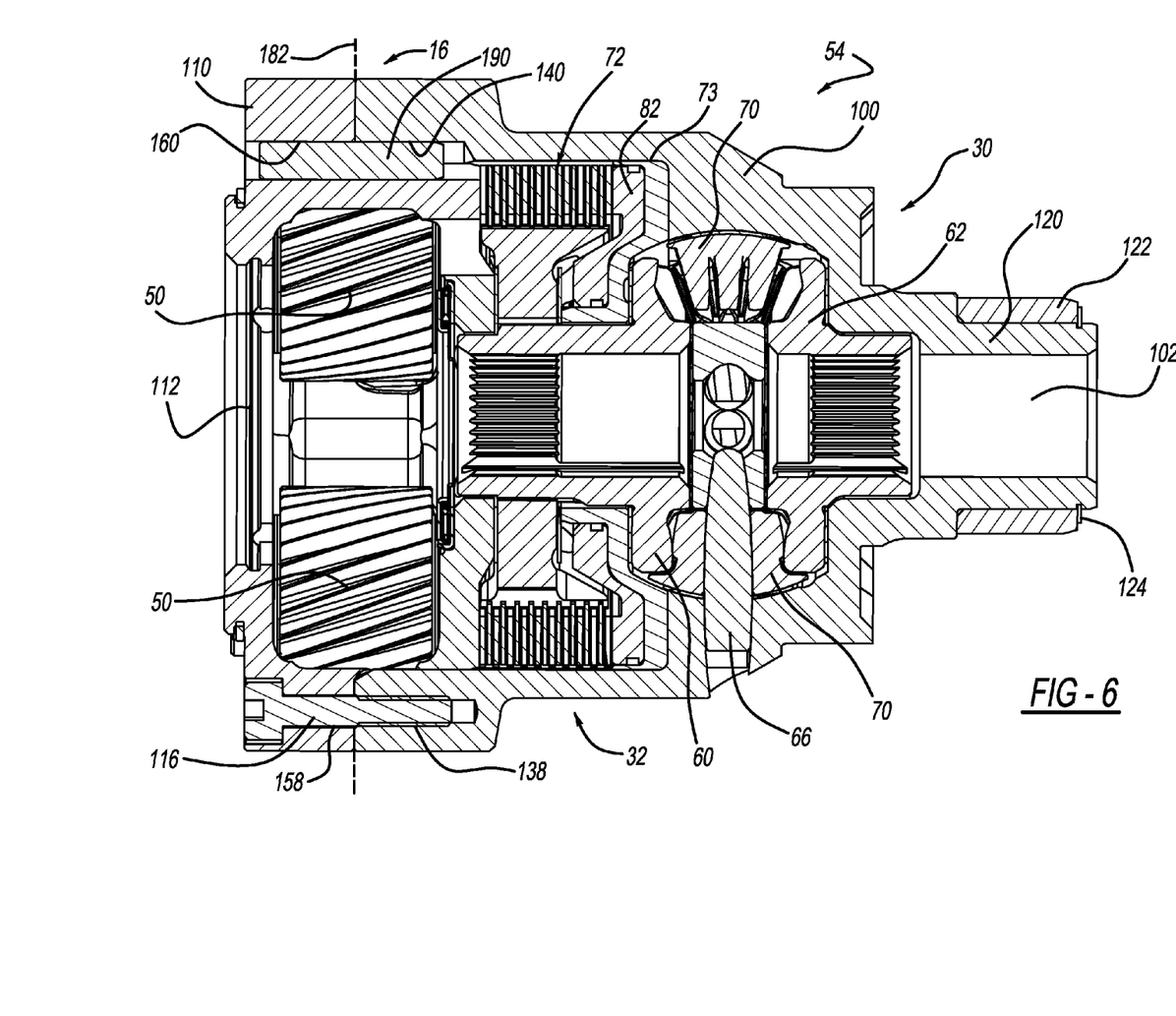
FIG. 6 is a cross-sectional view of the limited slip differential assembly taken along lines 6-6 of FIG. 5.

With additional reference now to FIGS. 2 and 3, additional features of the differential case 54 will be described. The differential case 54 can include a first differential case portion 100 that defines a first output shaft opening 102 (FIG. 3) and a second differential case portion 110 that defines a second output shaft opening 112 (FIG. 6). In the example shown, the first and second differential case portions 100 and 110 are separately formed and coupled together such as by a plurality of fasteners 116. As will become appreciated from the following discussion, the differential case 54 is split at a location through a corresponding surrounding wall at the planetary gear assembly 16. Splitting the differential case 54 in this manner allows the clutch assembly 32 to be larger and increases the torque capacity of the clutch assembly 32. At the same time, the required hydraulic pressure needed to actuate the clutch assembly 32 can be reduced.

Figure 4:
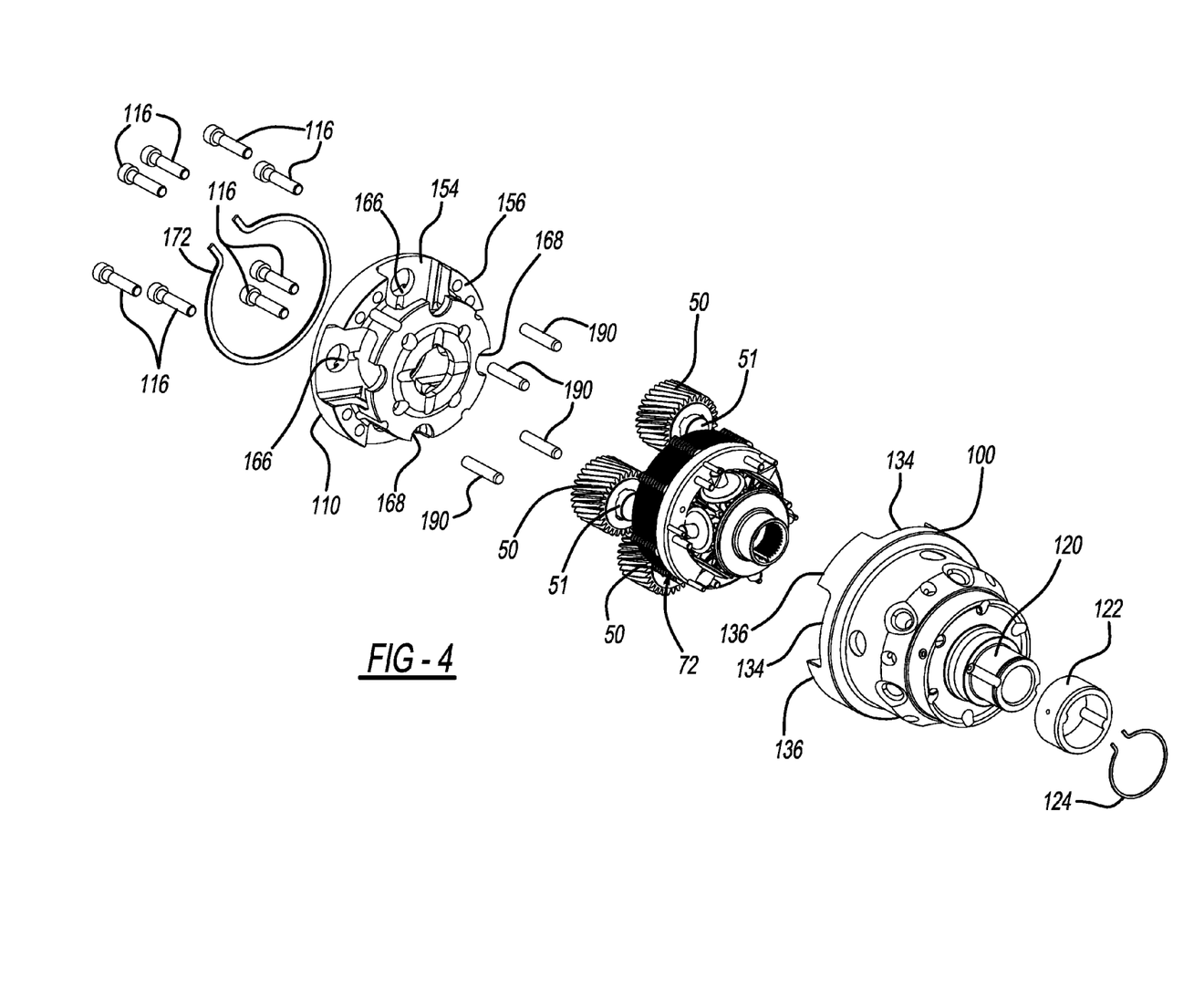
FIG. 4 is front perspective view of the limited slip differential shown in FIG. 2.

With particular reference to FIGS. 3 and 4, the first differential case portion 100 can include a hub 120. A hydraulic transfer bushing 122 can be received by the hub 120 of the first differential case portion 100. Specifically, the hydraulic transfer bushing 122 can be slidably received by the hub 120. A snap ring 124 can be received by a groove 126 on the hub 120 to retain the hydraulic transfer bushing 122. In one example, the hydraulic transfer bushing 122 can include fluid communication porting (not specifically shown) that is configured to deliver fluid to corresponding fluid communication porting (not specifically shown) defined on the first differential case portion 100. The fluid can be used to actuate the clutch assembly 32.

Figure 8:
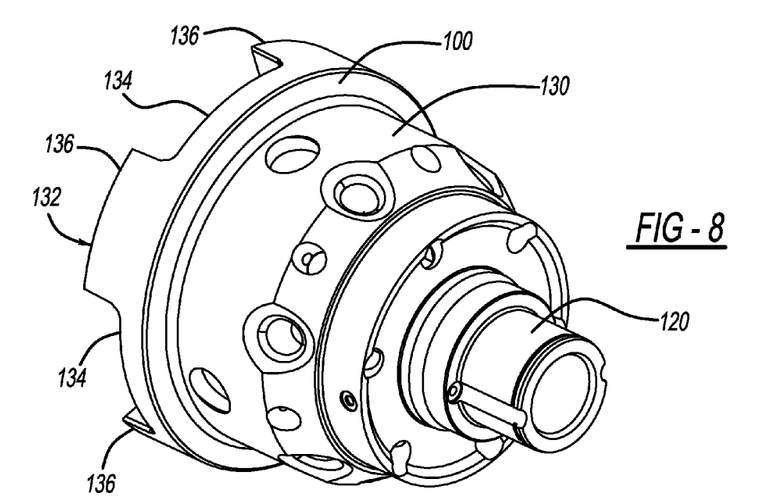
FIG. 8 is a front perspective view of the first differential case portion constructed in accordance to one example of the disclosure.
Figure 9:
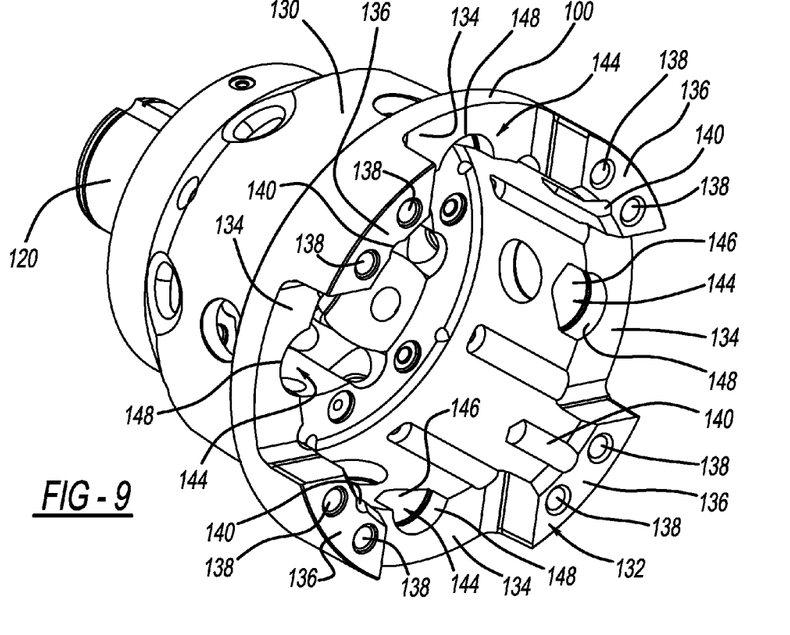
FIG. 9 is a rear perspective view of the first differential case portion shown in FIG. 8.

With particular reference now to FIGS. 8 and 9, the first differential case portion 100 will be described in greater detail. The first differential case portion 100 can generally include a first differential case body 130. The first differential case body 130 can include a first radial end surface 132 having a plurality of alternately arranged first inset portions 134 and outset portions 136. In the example shown, each of the plurality of first outset portions 136 can define a pair of first fastener receiving bores 138. The first differential case portion 100 can further include a plurality of first pin mounting grooves 140. The plurality of first inset portions 134 can include a first planetary gear shaft mounting surface 144. Each of the first planetary gear shaft mounting surfaces 144 can collectively comprise an end face surface 146 and a radial support surface 148. Each of the end faces 146 can axially oppose a corresponding planetary gear shaft 51. Each of the radial support surfaces 148 can radially oppose a corresponding planetary gear shaft 51.

Figure 5:
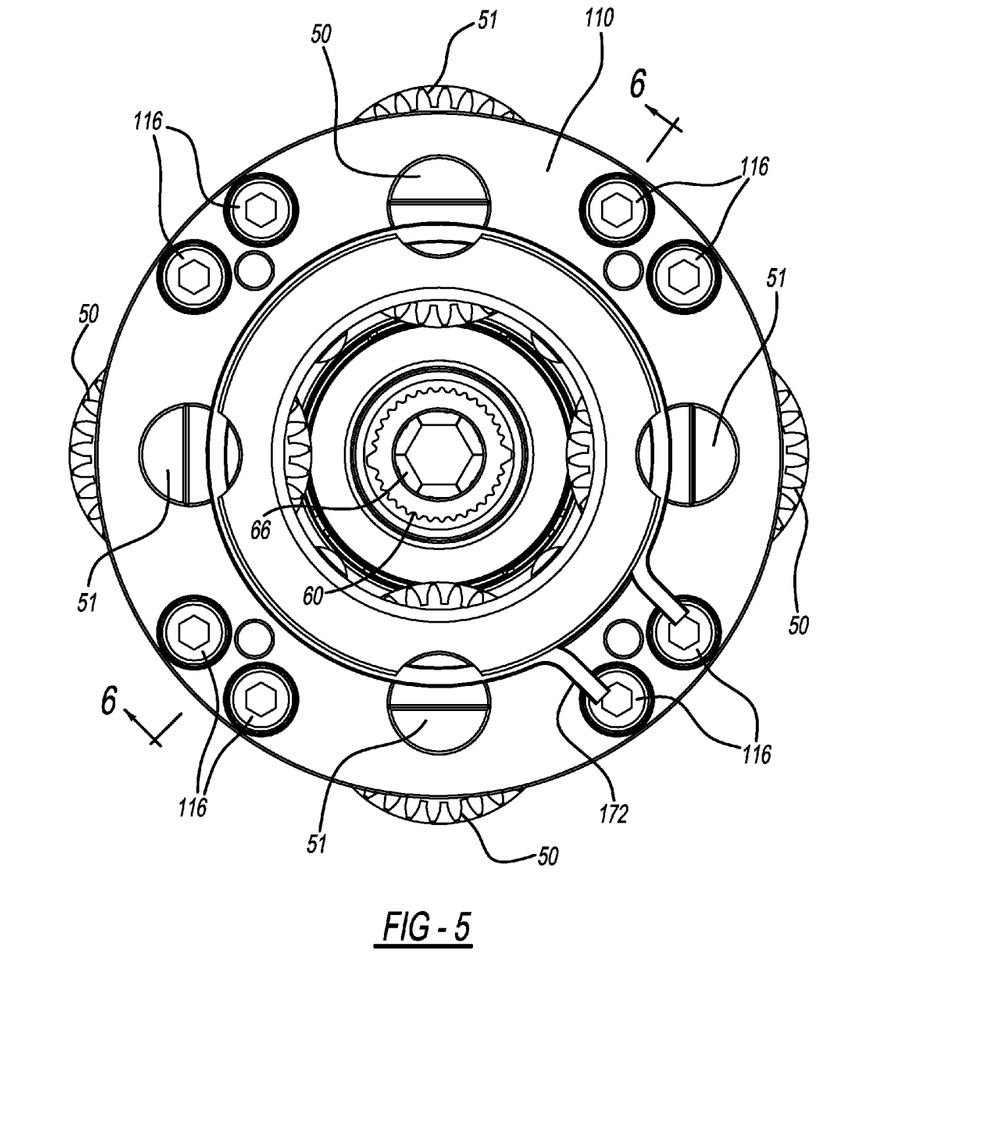
FIG. 5 is an end view of the limited slip differential shown in FIG. 2.
Figures 10, 11:
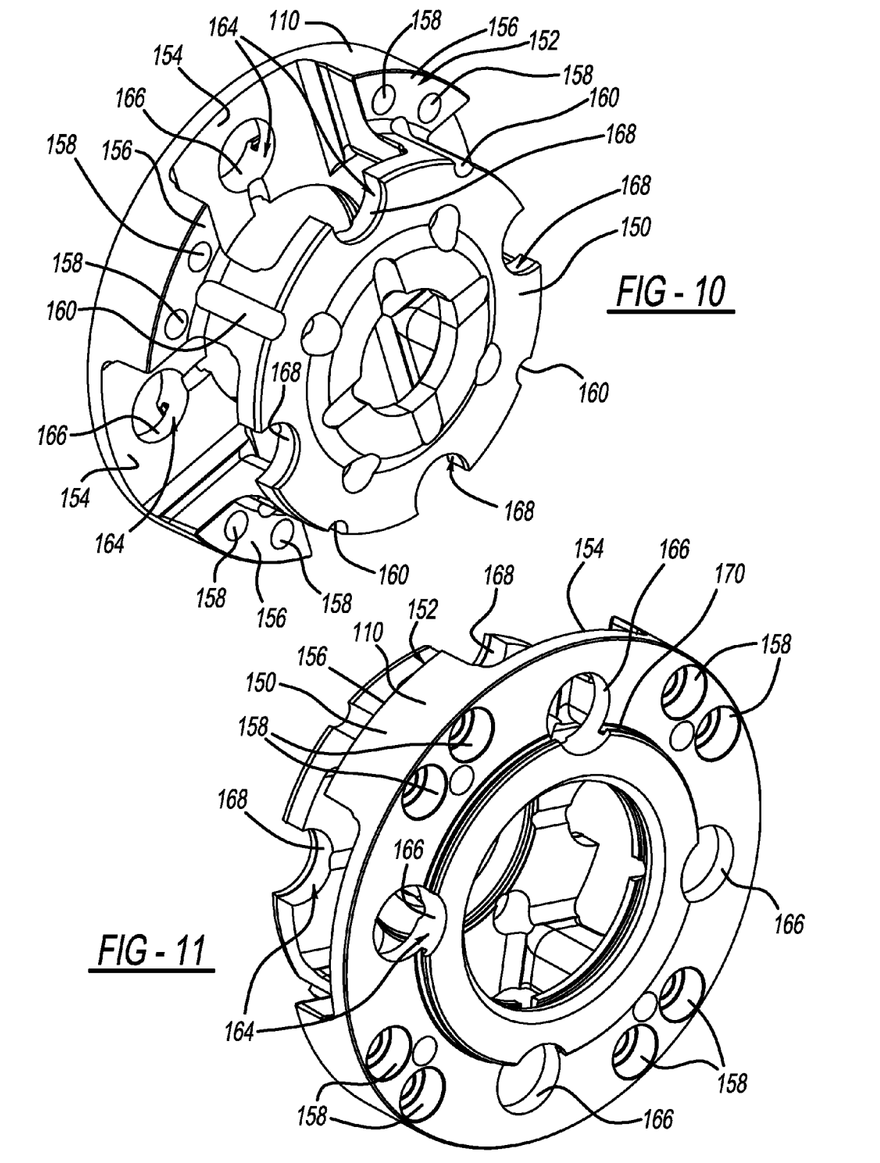
FIG. 10 is a rear perspective view of the second differential case portion constructed in accordance to one example of the present disclosure.
FIG. 11 is a front perspective view of the second differential case portion shown in FIG. 10.

Turning now to FIGS. 10 and 11, the second differential case portion 110 will be further described. The second differential case portion 110 generally includes a second differential case body 150. The second differential case body 150 can include a second radial end surface 152 that includes a plurality of alternately arranged second inset portions 154 and outset portions 156. Each of the second outset portions 156 can define a pair of second fastener receiving bores 158. The second differential case portion 110 can include a plurality of second pin mounting grooves 160. The second differential case portion 110 can further include a plurality of second planetary gear shaft mounting surfaces 164. Each of the plurality of second planetary gear shaft mounting surfaces 164 can include an outer radial support surface 166 and an inner radial support surface 168. The inner and outer radial support surfaces 166 and 168 can be axially offset relative to each other. The second differential case body 150 can define a snap ring groove 170 that is configured to receive a snap ring 172 in an assembled position (FIG. 5).

Figure 7:
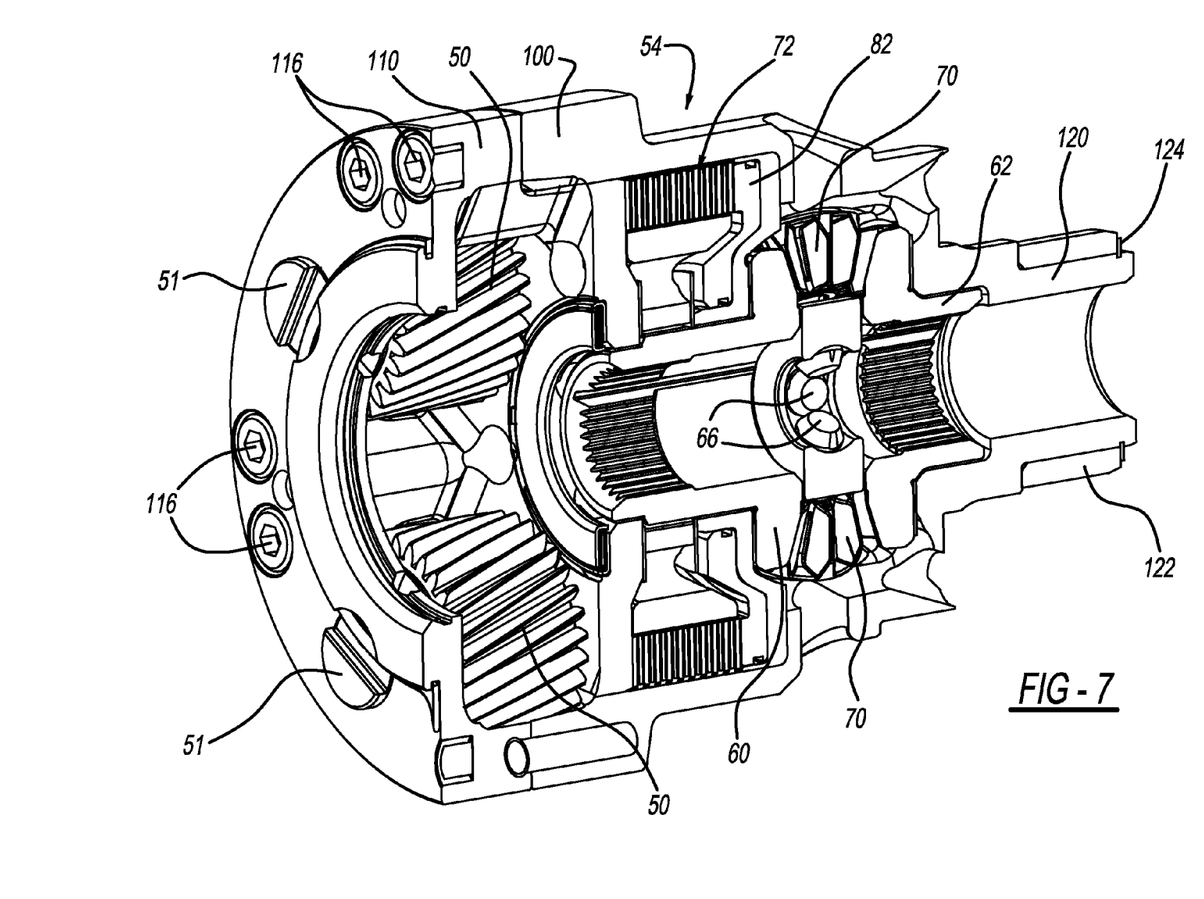
FIG. 7 is a cross-sectional view of the limited slip differential taken along lines 7-7 of FIG. 2.

In the assembled position (FIGS. 2, 6 and 7), the first inset portions 134 on the first differential case portion 100 align with a corresponding second inset portion 154 defined on the second differential case portion 110 to define a plurality of pockets 180 (FIG. 2) therebetween. The plurality of planetary gears 50 are received at the respective plurality of pockets 180. In the assembled position, the first outset portions 136 extending from the first differential case portion 100 align with the second outset portions 156 provided on the second differential case portion 110 at a mating plane 182 (FIG. 6) that intersects the plurality of planetary gears 50. In one example, the mating plane 182 can intersect the respective planetary gears 50 substantially at their axial midpoint.

With reference now to FIGS. 3, 4, 6 and 7, additional features of the differential assembly 34 will be described. A plurality of pins 190 can be supported between the first differential case portion 100 and the second differential case portion 110. Specifically, the pins 190 can be supported on a first end by the first pin mounting grooves 140 on the first differential case portion 100. Similarly, second ends of the pins 190 can be supported by second pin mounting grooves 160 provided on the second differential case portion 110. The pins 190 can cooperate to transfer tangential load together with the plurality of planetary gear shafts 51. In the assembled position (FIG. 5), the snap ring 172 is received in the snap ring groove 170 thereby axially retaining the plurality of planetary gear shafts 51 within the first and second differential case portions 100, 110.

In an assembled position (FIG. 6), the fasteners 116 can be advanced through the second fastener receiving bores 158 on the second differential case portion 110 and threadedly received at the first fastener receiving bores 138 on the first differential case portion 100. In the example provided, the fasteners can be M8 fasteners. In this regard, the design of the two piece differential case 54 can allow for larger bolts such as M8 instead of traditionally used M5 bolts.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A differential assembly comprising:
   a planetary gear assembly having a plurality of planetary gears rotatably mounted on a corresponding plurality of planetary gear shafts;
   a first differential case portion having a plurality of first planetary gear shaft mounting surfaces;
   a second differential case portion, separately formed from the first differential case portion and having a plurality of second planetary gear shaft mounting surfaces; and
   a differential gear assembly arranged in at least one of the first and second differential case portions;
   wherein the first and second plurality of gear shaft mounting surfaces cooperate to mount the corresponding plurality of planetary gear shafts in an assembled position.

2. The differential assembly of claim 1 wherein the first differential case portion includes a first radial end surface having a plurality of alternately arranged first inset portions and outset portions.

3. The differential assembly of claim 2 wherein the second differential case portion includes a second radial end surface having a plurality of alternately arranged second inset portions and outset portions.

4. The differential assembly of claim 3 wherein in the assembled position, the first inset portions align with the second inset portions to define a plurality of pockets therebetween, wherein the plurality of planetary gears are received at the respective plurality of pockets.

5. The differential assembly of claim 4 wherein in the assembled position, the first outset portions align with the second outset portions at a mating plane that intersects the plurality of planetary gears.

6. The differential assembly of claim 1, further comprising a plurality of fasteners that couple the first and second differential case portions together.

7. The differential assembly of claim 6, further comprising a plurality of pins that are received and supported between (i) a plurality of first pin mounting grooves defined on the first differential case portion and (ii) a plurality of second pin mounting grooves defined on the second differential case portion.

8. The differential assembly of claim 1, further comprising a snap ring received in a snap ring groove defined on one of the first and second differential gear case portions, the snap ring axially retaining the plurality of planetary gear shafts relative to the first and second differential case portions.

9. The differential assembly of claim 1 wherein each of the first plurality of planetary gear shaft mounting surfaces comprises (i) an end face surface that axially opposes a corresponding planetary gear shaft and (ii) a radial support surface that radially opposes a corresponding planetary gear shaft.

10. The differential assembly of claim 9 wherein each of the second plurality of planetary gear shaft mounting surfaces comprises (i) an outer radial support surface and (ii) an inner radial support surface wherein the outer and inner radial support surfaces are axially offset from each other.

11. The differential assembly of claim 1, further comprising a clutch assembly that couples the planetary gear assembly to the differential gear assembly.

12. A differential assembly comprising:
   a planetary gear assembly having a plurality of planetary gears rotatably mounted on a corresponding plurality of planetary gear shafts;
   a first differential case portion having (i) a plurality of first planetary gear shaft mounting surfaces and (ii) a plurality of first pin mounting grooves;
   a second differential case portion, separately formed from the first differential case portion and having (i) a plurality of second planetary gear shaft mounting surfaces and (ii) a plurality of second pin mounting grooves; and
   a plurality of pins that are received by the plurality of first and second mounting grooves in an assembled position;
   wherein the first and second plurality of gear shaft mounting surfaces cooperate to mount the corresponding plurality of planetary gear shafts in the assembled position.

13. The differential assembly of claim 12 wherein:
   the first differential case portion includes a first radial end surface having a plurality of alternately arranged first inset portions and outset portions;
   the second differential case portion includes a second radial end surface having a plurality of alternately arranged second inset portions and outset portions; and
   wherein in the assembled position, the first inset portions align with the second inset portions to define a plurality of pockets therebetween, wherein the plurality of planetary gears are received at the respective plurality of pockets.

14. The differential assembly of claim 13 wherein in the assembled position, the first outset portions align with the second outset portions at a mating plane that intersects the plurality of planetary gears.

15. The differential assembly of claim 12, further comprising a plurality of fasteners that couple the first and second differential case portions together.

16. The differential assembly of claim 12 wherein each of the first plurality of planetary gear shaft mounting surfaces comprises (i) an end face surface that axially opposes a corresponding planetary gear shaft and (ii) a radial support surface that radially opposes a corresponding planetary gear shaft.

17. The differential assembly of claim 16 wherein each of the second plurality of planetary gear shaft mounting surfaces comprises (i) an outer radial support surface and (ii) an inner radial support surface wherein the outer and inner radial support surfaces are axially offset from each other.

18. A differential assembly comprising:
- a planetary gear assembly having a plurality of planetary gears rotatably mounted on a corresponding plurality of planetary gear shafts;
- a first differential case portion having (i) a plurality of first planetary gear shaft mounting surfaces; (ii) a plurality of first pin mounting grooves and (iii) a first radial end surface;
- a second differential case portion, separately formed from the first differential case portion and having (i) a plurality of second planetary gear shaft mounting surfaces, (ii) a plurality of second pin mounting grooves and (iii) a second radial end surface;
- a plurality of pins; and
- a plurality of fasteners;
- wherein in an assembled position, (i) the plurality of pins are received by the plurality of first and second pin mounting grooves, (ii) the first and second plurality of gear shaft mounting surfaces cooperate to mount the corresponding plurality of planetary gear shafts and (iii) the first and second radial end surfaces align at a mating plane that intersects the plurality of planetary gears.

19. The differential assembly of claim 18 wherein each of the first plurality of planetary gear shaft mounting surfaces comprises (i) an end face surface that axially opposes a corresponding planetary gear shaft and (ii) a radial support surface that radially opposes a corresponding planetary gear shaft.

20. The differential assembly of claim 19 wherein each of the second plurality of planetary gear shaft mounting surfaces comprises (i) an outer radial support surface and (ii) an inner radial support surface wherein the outer and inner radial support surfaces are axially offset from each other.

* * * * *